United States Patent [19]

Tsukada

[11] Patent Number: 4,937,150
[45] Date of Patent: Jun. 26, 1990

[54] ULTRAFINE GRAIN FLUORESCENT BODY

[75] Inventor: Katsura Tsukada, Yatabe, Japan

[73] Assignees: Research Development Corporation; Stanley Electric Company, Ltd., both of Tokyo, Japan

[21] Appl. No.: 289,499

[22] Filed: Dec. 23, 1988

Related U.S. Application Data

[63] Continuation of Ser. No. 92,925, Sep. 4, 1987.

[30] Foreign Application Priority Data

Sep. 5, 1986 [JP] Japan ................... 61-210473

[51] Int. Cl.$^5$ .............................................. C09K 11/50
[52] U.S. Cl. ................... 428/690; 428/691; 252/301.4 R; 313/506
[58] Field of Search ............... 428/690, 691, 917; 252/301.4 F, 301.4 R, 301.4 H; 313/503, 506

[56] References Cited

U.S. PATENT DOCUMENTS 4,486,499 12/1984 Morimoto ............... 428/690 X
4,661,373 4/1987 Kato et al. ............... 428/690 X
4,680,231 7/1987 Yamaura et al. ........... 428/690 X

FOREIGN PATENT DOCUMENTS 68887 6/1977 Japan .
6764 1/1979 Japan .

Primary Examiner—James Seidleck
Attorney, Agent, or Firm—Armstrong, Nikaido, Marmelstein, Kubovcik & Murray

[57] ABSTRACT

An ultrafine grain fluorescent body comprises an ultrafine grain luminescent material containing an activator and having a surface carrying thereon a layer which is formed from a different material from the luminescent material, or which has different properties from those of the luminescent material. The layer forms a heterojunction or p-n junction defining a luminescent mechanism in an interface between the luminescent material and the layer. The heterojunction is formed if the layer is a film of oxide, nitride or any other different substance formed on the surface of the luminescent material, e.g. ZnS, having a grain size of several hundred to several thousand angstroms. Alternatively, the p-n junction is formed if the luminescent material is a p-type (or n-type) semiconductor, and if the layer is a film of an n-type (or p-type) a semiconductor formed on the surface thereof. The fluorescent body of this invention is useful for making an electroluminescent (EL) element having a high luminance, a high luminescent efficiency and a high resolution, and capable of being driven by a low voltage.

4 Claims, 2 Drawing Sheets

ULTRAFINE GRAIN FLUORESCENT BODY

This application is a continuation of application Ser. No. 092,925 filed Sept. 4, 1987.

BACKGROUND OF THE INVENTION

1. Field of the Invention:

This invention relates to a fluorescent body. More particularly, it is a fluorescent body having a novel luminescent mechanism which can advantageously be used for making various kinds of electroluminescent (EL) elements.

2. Description of the Prior Art:

There are known various kinds of fluorescent bodies which are used for making EL elements. They mainly comprise a luminescent material, such as ZnS, and contain Cu, Cl, I, Al, Mn, etc. as an activator. Their combinations include (ZnS:Cu, Cl), (ZnS:Cu, I), (ZnS:Cu, Al) and (ZnS: Cu, Mn).

When a voltage is applied to any such fluorescent body to excite its activator, it is necessary to apply a voltage of at least $10^6$ V/cm in a direct electric field. The electric field which is usually applied to an EL element, however, has a strength of, say, 1 to $3 \times 10^4$ V/cm, and this strength is actually high enough to excite the activator. The fluorescent body of the type as hereinabove described contains a greater amount of copper than any ordinary type of fluorescent body used for exciting cathode rays, etc., so that $Cu_xS$ may be precipitated in the crystal defect or grain boundary of the luminescent material (ZnS) and form an interface with ZnS defining an energy barrier which enables the partial creation of an electric field having a strength of at least $10^6$ V/cm. This is the luminescent mechanism of the fluorescent body.

The fluorescent body is said to be a polycrystalline substance 30 having a grain diameter of several tens of microns and containing $Cu_xS$ 31, as shown in FIG. 6. When a dispersion type EL element is manufactured, a fluorescent body having a grain diameter of, say, 20 to 30 microns is, for example, mixed with a binder. The mixture is applied to a transparent electrode on a sheet of glass or a film to form a luminescent layer thereon and a back electrode is attached thereto, while an insulating layer is provided therebetween.

The luminescent layer in the EL element as hereinabove described has a thickness of, say, 50 to 100 microns, as the fluorescent body has a grain diameter of several tens of microns. If a fluorescent body having a smaller grain size is used, it is possible to form a luminescent layer having a smaller thickness and a higher degree of uniformity and density which make it more suitable for practical application.

A number of methods are, therefore, employed for producing a fluorescent body having a smaller grain size. They include etching and mechanical crushing or classification. However, the conventional products of these methods have usually had a number of drawbacks including low luminance. As the fluorescent body has a luminescent mechanism introduced in the crystal defect or grain boundary of the luminescent material, its luminance is greatly dependent on their size or number. If the crystal defects, etc. are increased to increase the luminescent mechanism, the fluorescent body has only a limited degree of crystallinity. Any of the conventional methods as hereinabove mentioned can only reduce the grain size of the fluorescent body to a level of, say, three microns. This level of reduction even does harm to the crystal, rather than being effective. Therefore, there has hitherto been no alternative but to employ a fluorescent body having a grain diameter of several tens of microns in order to obtain a practical compromise between its crystallinity and the performance of the luminescent mechanism. It has naturally been impossible to form a luminescent layer having a satisfactorily small thickness and a satisfactorily high degree of uniformity and density. It has, therefore, been difficult to produce any fluorescent body that enables a high luminescent efficiency, being driven by a low voltage and having a high degree of luminance.

SUMMARY OF THE INVENTION

It is an object of this invention to overcome the drawbacks of the prior art as hereinabove pointed out and provide a fluorescent body having a novel luminescent mechanism which enables a high luminescent efficiency and a high luminance and which may be driven by a low voltage.

The inventor of this invention has energetically studied the possibility of obtaining a luminescent mechanism which differs from any conventionally known one, and achieving a high luminescent efficiency, etc. to attain the object of this invention. As a result, he has found that the object can be attained if a film of oxide, nitride, etc. is formed on the surface of an ultrafine grain luminescent material to introduce a luminescent mechanism.

Thus, this invention comprises an ultrafine grain fluorescent body which comprises an ultrafine grain luminescent material containing an activator and having a surface carrying thereon a layer formed from a different substance from the luminescent material or having different properties from those of the luminescent material, the layer forming a heterojunction or p-n junction which defines a luminescent mechanism in an interface between the luminescent material and the layer.

BRIEF DESCRIPTION OF THE DRAWINGS

FIGS. 1 and 2 are schematic illustrations of apparatus which can be used for producing an ultrafine grain fluorescent body embodying this invention, FIG. 1 showing an apparatus for performing flash evaporation in a gas, while FIG. 2 shows a fluidized bed type electric furnace;

FIGS. 4 and 5 are diagrams showing the emission spectra of the ultrafine grain fluorescent body embodying this invention in comparison with those of a comparative material, FIG. 4 showing the spectra of photoluminescence, while FIG. 5 shows the spectra of electroluminescence.

DETAILED DESCRIPTION OF THE INVENTION

Figure 1:
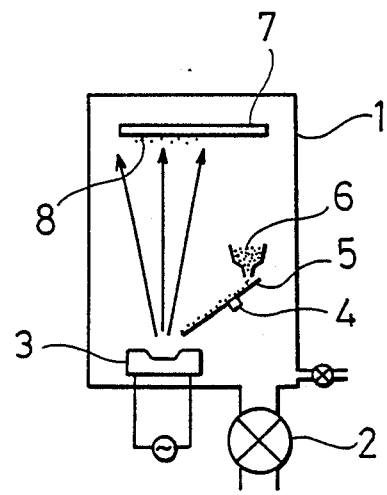

The fluorescent body of this invention is composed of ultrafine grains. The ultrafine grains generally have a number of features including (1) a large specific surface, (2) high crystallizability, and (3) a very small diameter comprises the order of, say, several hundred to several thousand angstroms. These features are effectively utilized in the fluorescent body of this invention, as will hereinafter be described.

The surfaces of ultrafine grains of a luminescent material, such as ZnS, are coated with a film of oxide, nitride, etc., whereby a kind of high-resistance heterojunction is formed in an interface. Alternatively, if the luminescent material is an n-type (or p-type) semiconductor, its surface is doped or otherwise treated to form a p type (or n-type) semiconductor film thereon, whereby a p-n junction is formed. The heterojunction or p-n junction defines a novel luminescent mechanism in the vicinity of the surface of the luminescent material. As the ultrafine grains have a very large specific surface, the luminescent mechanism occupies a large area and thereby enables a high luminance. Moreover, the high crystallizability of the ultrafine grains enables a high luminescent efficiency. Thus, the features (1) and (2) are effectively utilized.

The feature (3) means that the luminescent material which is employed for producing the fluorescent body of this invention has a grain diameter which is smaller by, say, two figures than that of the material which has conventionally been employed. The ultrafine grains can form a luminescent layer having a very small thickness to which an electric field of high strength is applicable. Therefore, the fluorescent body of this invention can be used to produce an EL element which exhibits a high luminance or can be driven by a low voltage. It can also form a film of high density which enables the formation of a dot matrix.

These ultrafine grains can be prepared not only from ZnS, but also from any other appropriate luminescent material, such as SrS, CaS, ($Y_2O_2S:Eu^{3+}$, ($Zn_2SiO_4:Mn^{2+}$) or (ZnO:Zn), by a variety of physical or chemical methods. Examples of the physical methods include various methods for performing evaporation in a gas by employing resistance heating, flash heating, plasma jet heating, induction heating, electron beam heating, laser beam heating, or sputtering. Examples of the chemical methods include gas-phase methods which employ an electric furnace, a chemical flame, a plasma or a laser, precipitation methods which include coprecipitation, hydrolysis, uniform precipitation, oxidative hydrolysis and reduction, and solvent evaporation methods which include freeze drying, spray drying and spray thermal decomposition. Any method can be employed if it produces ultrafine grains.

The layer formed a different substance than the luminescent material is a layer which can be formed by the oxidation, nitriding, or other treatment of the luminescent material It is, for example, a layer of its oxide, nitride, sulfide, chloride, fluoride, bromide, iodide, sulfoxide, selenide, telluride, phosphide or cyanide.

BEST MODE OF CARRYING OUT THE INVENTION

The ultrafine grain fluorescent body of this invention and a method of producing it will now be described more specifically by way of example. The following example is, of course, not intended to limit the scope of this invention.

EXAMPLE

The ultrafine grains of a luminescent material are prepared by a method which employs flash heating for evaporation in a gas. According to an ordinary method which employs resistance heating, etc. for evaporation in a gas, the material to be evaporated is heated in an inert gas atmosphere having a reduced pressure and the resulting vapor is collected on a substrate to form ultrafine grains thereon. According to the method which employs flash heating, an appropriate mixture of a powder of a luminescent material (e.g. ZnS) and a powder of an activator (e.g. Mn) is heated in an apparatus of the type which is shown by way of example in FIG. 1. The apparatus comprises a vacuum vessel 1 evacuated by a vacuum pump 2 and containing an inert gas having a reduced pressure of several to several hundred torr. The powder mixture 6 is continuously dropped little by little into a high temperature crucible 3 by a chute 5 provided with a vibrator 4. The vapor rising from the crucible 3 is collected on a substrate 7 positioned above it to form ultrafine grains 8 thereon. If the crucible 3 has a sufficiently high temperature, the powder which is dropped little by little is very quickly heated for evaporation. This not only makes it possible to produce the ultrafine grains which share various properties with those produced by any ordinary method for evaporation in a gas, but also facilitates the control of a stoichiometric ratio. This advantage can also be obtained by a method which employs laser beam heating. According to this method, the material to be evaporated is placed in a crucible in a vacuum vessel and a laser beam is locally radiated on the material from outside the vessel through a window.

Any ordinary method for carrying out evaporation in a gas or any other method as hereinbefore mentioned can, of course, also be employed for preparing the ultrafine grains which can be used for producing the fluorescent body of this invention.

The ultrafine grains are, then, subjected to heat treatment whereby the activator (e.g. Mn) is diffused, and surface treatment whereby a film of oxide, nitride, etc. is formed.

Figure 2:
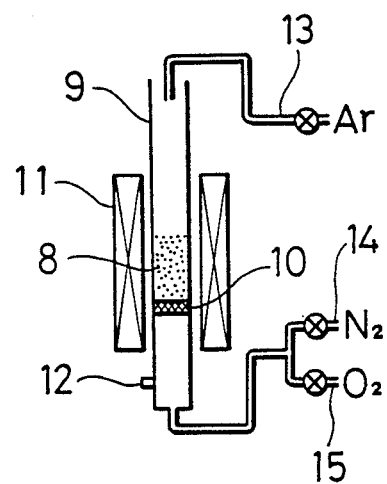

FIG. 2 shows by way of example an apparatus which can be used for carrying out those treatments. It is a fluidized bed type electric furnace comprising a quartz glass tube 9, a glass filter 10 provided therein, an electric heating coil 11 surrounding the tube 9, a vibrator 12 provided on the tube 9, a conduit 13 for introducing argon gas into the tube 9, a conduit 14 for introducing nitrogen gas into the tube 9 and a conduit 15 for introducing oxygen gas into the tube 9.

An appropriate amount of ultrafine grains 8 is placed on the glass filter 10 having pores through which gas can pass. After argon gas has been introduced through the conduit 13 for purging the tube 9, nitrogen gas is introduced into the tube 9 at the bottom thereof and the vibrator 12 is driven to vibrate the tube 9 so that the ultrafine grains 8 may form a fluidized bed. The tube 9 and therefore the fluidized bed are heated to an appropriate temperature by the coil 11 so that the activator (Mn) may be diffused through the ultrafine grains.

Then, the supply of nitrogen gas is stopped and oxygen gas is introduced into the tube 9 at the bottom thereof, while the heating coil 11 is kept in operation. The supply of oxygen gas is continued for an appropriate length of time so that the surfaces of the ultrafine grains may be oxidized. Then, it is stopped and the supply of nitrogen gas is resumed, whereupon the oxidation of the ultrafine grains is completed.

The treatment of ultrafine grains in a fluidized bed has a number of advantages. For example, it is possible to heat the grains uniformly, bring oxygen gas into uniform contact with the grains, and prevent the sintering of the grains.

Figure 3:
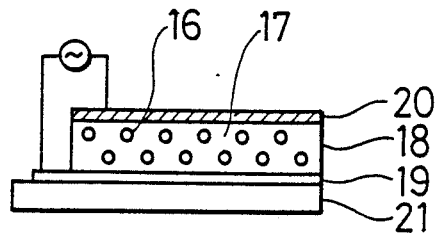
FIG. 3 is a cross-sectional view of a measuring EL element.

A measuring EL element of the construction shown in FIG. 3 was made by using an ultrafine grain fluorescent body embodying this invention which had been prepared as hereinabove described. A luminescence test was conducted by applying a voltage to the EL element. The element comprised a luminescent layer 18 containing the ultrafine grain fluorescent body 16 dispersed in an organic binder 17, a transparent electrode (ITO) 19 and a back electrode 20 between which the luminescent layer 18 was sandwiched, and a slide glass 21 attached to the transparent electrode 19. For the sake of comparison, an element of the same construction was made by using ultrafine grains of ZnS which had not been subjected to surface oxidizing treatment.

Figure 4:
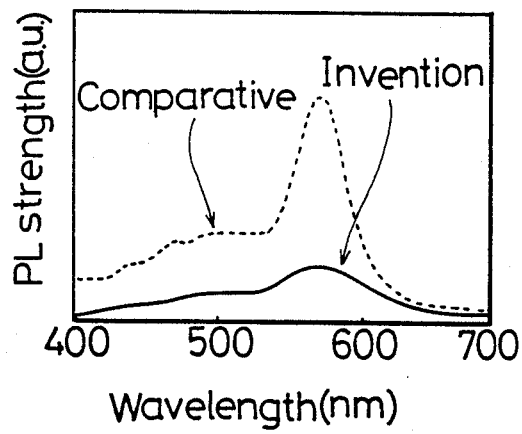
Figure 5:
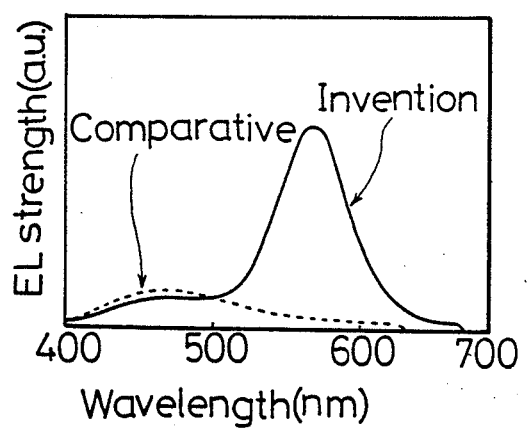
Figure 6:
FIG. 6 is a schematic illustration of a grain of a conventionally known fluorescent body.

Each of the two elements was subjected to a photoluminescence (PL) and an electroluminescence (EL) test. FIG. 4 shows the emission spectra which were obtained from the PL test, and FIG. 5 shows the emission spectra obtained from the EL test.

As is obvious therefrom, the element containing the fluorescent body of this invention showed an emission of light due to the excitation of Mn in the vicinity of a wavelength of 575 nm as a result of both of the PL and EL tests. On the other hand, the comparative element did not show any similar emission as a result of the EL test (FIG. 5), though it showed a similar emission as a result of the PL test (FIG. 4). The fact that both the element according to this invention and the comparative element showed an emission of light due to the excitation of Mn as a result of the PL test confirmed the diffusion of Mn as the activator into the ultrafine grains of ZnS. As a result of the EL test, however, only the element according to this invention showed an emission of light. This fact teaches that ZnO, which had been formed by the oxidation of the surfaces of the ultrafine grains of ZnS, enclosed ZnS, resulting in the formation between ZnO and ZnS of an interface defining a luminescent mechanism.

Although the production of the fluorescent body according to this invention has been described as being carried out by employing the apparatus shown in FIGS. 1 and 2, it is, of course, possible to employ any other method or apparatus. For example, it is possible to use another inert gas instead of nitrogen, or another oxidizing gas instead of oxygen.

INDUSTRIAL APPLICABILITY

This invention provides an ultrafine grain fluorescent body having a novel luminescent mechanism formed in the surface of an ultrafine grain luminescent material, as hereinabove described. It has, among others, the following advantages:

(1) As the surfaces of the ultrafine grains having a very large specific surface are utilized to form a luminescent mechanism, it also has a large specific surface which enables a high luminance.

(2) As the fluorescent body has a grain size which is as small as, say, several hundred to several thousand angstroms, it is possible to form a luminescent layer having a very small thickness as compared with a thickness of 50 to 100 microns which has hitherto been possible. Such a luminescent layer has a high electric field strength upon application of a voltage and therefore enables the manufacture of an EL element which has a high luminance, or can be driven by a low voltage. The layer has a high density of the fluorescent body and therefore enables the formation of a dot matrix. (3) While the conventional fluorescent body is a polycrystalline body having many crystal defects, the fluorescent body of this invention can be produced as a single crystal if an appropriate method is employed. At any rate, it is a fluorescent body of high crystallinity which enables a high luminescent efficiency.

Therefore, the ultrafine grain fluorescent body of this invention can be used to produce an EL element having a high luminance, a high luminescent efficiency and a high resolution, and capable of being driven by a low voltage, which has not been available in the art.

What is claimed is:

1. An electroluminescent element comprising an electroluminescent layer comprising a fluorescent body comprising ultrafine grains of a luminescent material containing an activator and dispersed in an organic binder, said grains having a grain size of several hundred to several thousand angstroms and having a surface layer formed from a different substance than said luminescent material, said surface layer forming a heterojunction defining a luminescent mechanism in an interface between said luminescent material and said surface layer, wherein said surface layer contains the same metallic element as said luminescent material and is a member selected from the group consisting of an oxide, a nitride, a sulfide, and a chloride formed from the metal of said luminescent material by a surface treatment in a gaseous atmosphere.

2. An electroluminescent element as set forth in claim 1, wherein said luminescent material is selected from the group consisting of ZnS, SrS, CaS, $Y_2O_2S$, $ZnSiO_4$ and ZnO, while said activator is selected from the group consisting of Cu, Cl, I, Al, Mn and Eu.

3. An electroluminescent element as set forth in claim 1, wherein said luminescent material is an n-type semiconductor and said layer is a film of a p-type semiconductor, whereby said p-n junction is formed.

4. An electroluminescent element as set forth in claim 1, wherein said luminescent material is a p-type semiconductor and said layer is a film of an n-type semiconductor, whereby said p-n junction is formed.

* * * * *